United States Patent [19]

Morton et al.

[11] Patent Number: 5,308,369
[45] Date of Patent: May 3, 1994

[54] SNAP-IN FILTER BAG ASSEMBLY FOR BOTTOM LOADING IN DUST COLLECTOR

[75] Inventors: Leslie R. Morton, Town of Spafford; Ronald P. Nadeau, Syracuse, both of N.Y.

[73] Assignee: Griffin Environmental Company, Inc., Syracuse, N.Y.

[21] Appl. No.: 53,247

[22] Filed: Apr. 28, 1993

[51] Int. Cl.⁵ .............................................. B01D 46/02
[52] U.S. Cl. ...................................... 55/379; 55/302; 55/380; 55/500; 55/501; 55/507
[58] Field of Search .................. 55/302, 369, 379, 380, 55/500, 501, 507

[56] References Cited

U.S. PATENT DOCUMENTS

| | | | |
|---|---|---|---|
| 4,042,356 | 8/1977 | Miller | 55/379 X |
| 4,266,954 | 5/1981 | Oare et al. | 55/379 X |
| 4,292,057 | 9/1981 | Ulvestad et al. | 55/302 |
| 4,306,893 | 12/1981 | Fernando et al. | 55/302 |
| 5,202,021 | 4/1993 | Griffin et al. | 55/379 X |

Primary Examiner—Charles Hart
Attorney, Agent, or Firm—Harris Beach & Wilcox

[57] ABSTRACT

A cylindrical filter bag including a wire mesh cage is provided with an access opening in the cage proximate to the open end of the filter bag. A resilient snap band is provided around the outer circumference of the cylindrical filter bag. The snap band includes a pair of felt rings formed around the band and an annular groove between the rings. The snap band thus provided can be depressed into the access opening in the wire mesh cage to allow the filter bag to be readily positioned in an airtight manner within a circular hole provided in the tube sheet of a dust collector. The hole in the tube sheet is provided with a collar having a radially extended flange portion that is attached to the top surface of the tube sheet to center the collar above the hole. The wire mesh cage of the filter bag is further provided with a reinforcing sleeve that mates with the tube sheet collar, and a venturi that is positioned concentrically within the sleeve.

10 Claims, 3 Drawing Sheets

SNAP-IN FILTER BAG ASSEMBLY FOR BOTTOM LOADING IN DUST COLLECTOR

BACKGROUND OF THE INVENTION

1. Field of the Invention

This invention relates in general to industrial dust collectors and, in particular, to an improved bottom loading filter bag assembly for the baghouse of an industrial dust collector. More specifically, but without restriction to the particular description shown, this invention relates to a snap band provided at the open end of a filter bag having an internal support cage, the band and cage allowing the bag to be quickly mounted and sealed within the tube sheet of a baghouse from beneath the tube sheet.

2. Discussion of the Prior Art

Demand from various industries for effective environmental control systems has recently been greater than heretofore because of the advent of increasingly stringent environmental regulations. One area of particular concern has been air quality control. In a wide variety of industries dealing with the processing of bulk materials such as cement, chemicals, fertilizers, food grains, paper and minerals, dust collectors well known in the art have typically been employed to remove airborne particulate matter from the processing environment.

These dust collectors commonly include a hopper and an upper housing having a baghouse. A tube sheet is provided in the upper housing to support a number of cylindrical filter bags. The filter bags typically include an internal wire cage or stiff ribbing for structural support. The tube sheet effectively divides the upper housing into two distinct regions. These two regions include a filter bag region or baghouse situated below the tube sheet and a clean air chamber above the tube sheet. In this known configuration, the filter bags are suspended downwardly from the tube sheet. The bottom end of each bag is closed while the top end is open. A circular hole for each filter bag is provided in the tube sheet so that the open end of the bag can be placed in communication with the clean air chamber. The hopper of the dust collector typically contains an inlet connected to an internal baffle while the clean air chamber includes an outlet in communication with an exhaust or draft fan.

In operation, dust laden air is removed from the processing environment by an air duct connected to the hopper inlet. This dirty air is distributed within the upper housing by the internal baffle, which reduces air velocity and disperses the air uniformly throughout the housing. Heavier dust particles are separated from the airstream and fall into the hopper. Lighter, airborne particles are collected on the outside surface of the filter bags while the air is drawn through the bag fabric and upward inside the bag, past the tube sheet, and then into the clean air chamber. From there it is continually drawn through ducts to be induced draft fan. At this point, the filtered air is either discharged to the atmosphere or returned to the processing environment. Periodically, the bags are cleaned by a jet of high pressure air emitted through blow tubes placed horizontally in the clean air chamber above the open top of a row of bags. The downward flowing air jet causes accumulated dust to be dislodged from the outside surface of the bags. This dust then falls into the hopper. All the dust and particulate matter collected in the hopper is removed therefrom by an airlock or a screw conveyor and airlock combined.

The above-described dust collector is typically placed on the exterior of the facilities that contain the processing environment. In this type of installation, the outlet and inlet of the dust collector would have potentially long air ducts leading to and from the facility or building containing the processing environment. When the dust collector is so positioned without any overhead obstructions, the 5 to 8 foot filter bags can easily be installed and replaced through access panels provided in the top of the dust collector.

In some applications, however, the dust collector is better positioned within the interior of the building or structure containing the processing environment. Overhead obstructions are often encountered in these installations, thus making it desirable to be able to install and replace the long filter bags from beneath the tube sheet rather than through access panels in the top of the baghouse. To accommodate the installation and replacement of these bottom loading filter bags, the baghouse is provided with a side access panel positioned below the tube sheet.

Prior bottom loading filter bags include a wire mesh cage that extends from the bottom of the filter bag to its open end. A collar is placed around the open end of the wire cage. The material forming the filter bag is folded over the collar and tucked into the interior of the wire cage. To mount this type of bottom loading filter bag, the tube sheet is provided with a downwardly projected collar welded around the hole provided in the tube sheet. These known bottom loading filter bags are mounted by sliding the cage collar over the tube sheet collar and then securing the assembly by use of a hose clamp. In this arrangement, the filter material of the bag is sandwiched between the two collars.

These prior bottom loading filter bags are limited in that the portion of the filter material folded over into the interior of the supporting wire cage will crimp thereby creating small folds around the interior of the filter bag opening. The small folds create paths between the cage and tube sheet collars that allow dirt or dust laden air to enter directly into the interior of the filter bag and then into the clean air chamber. This leakage can occur even when the hose clamp is fully tightened. The baghouse of an industrial dust collector could typically contain over a hundred filter bags. The leakage occurring at one filter bag is thus increased by the total of bags contained in the baghouse. In addition, the use of a hose clamp, needing to be tightened manually for each individual filter bag, results in an excessive amount of time for installation and replacement of the filter bags.

Since dust collectors are increasingly required to capture virtually every particle of finer and finer dusts in a variety of environments, the above-discussed prior art filter bag assemblies are becoming outmoded.

OBJECTS AND SUMMARY OF THE INVENTION

It is, therefore, an object of the present invention to improve dust collectors.

A further object of the present invention is to enable a filter bag to be easily mounted in an air-tight manner to the tube sheet provided in the baghouse of a dust collector.

It is yet a further object of the present invention to improve bottom loading filter bags supported by a tube sheet in the baghouse of a dust collector.

Another object of the present invention is to enable a filter bag to be quickly mounted in the tube sheet provided in the baghouse of a dust collector from beneath the tube sheet.

An additional object of the present invention is to enable a filter bag to be quickly mounted in an air-tight manner to the tube sheet provided in the baghouse of a dust collector from a position below the tube sheet.

Still another object of the present invention is to enable the use of a tight sealing snap band filter bag in dust collectors with bottom access tube sheets to obtain an airtight seal eliminating leakage between the bag and the tube sheet.

Yet another object of the present invention is to provide the top surface of a tube sheet of a dust collector with a collar and the wire mesh cage of a filter bag with a sleeve so that a tight slip fit exists between the collar and sleeve to prevent lateral movement of the cage relative to the tube sheet when the filter bag is mounted therein.

These and other objects are attained in accordance with the present invention wherein there is provided a cylindrical filter bag including a wire mesh cage that extends from the bottom of the bag to slightly beyond the open end of the bag. The filter bag is formed from a dust impervious cloth material and an access opening is provided in the wire mesh cage proximate to the open end of the filter bag. A resilient circular snap band is provided around the outer circumference of the filter bag proximate to the open end thereof to allow a portion of the cloth material forming the filter bag to extend beyond the snap band.

A length of felt having top and bottom edges is attached to the outer circumference of the resilient snap band. Each of these edges is rolled upon itself to form a pair of felt rings around the snap band and an annular groove between the rings. The extended cloth material at the open end of the filter bag is folded over the resilient snap band and attached to the outside surface of the filter bag below the band. In this manner, when the snap band is depressed into the access opening in the wire mesh cage, the open end of the filter bag can be readily positioned within a circular hole provided in the tube sheet and subsequently allowed to retain its original circular shape. Upon this reformation of the snap band, the edges of the circular hole will effectively push the cloth material into the annular groove between the felt rings to form an airtight seal between the filter bag and the tube sheet.

To provide added stability to the filter bag and supporting wire cage, each hole in the tube sheet is provided with a collar having a radially extended flange portion that is attached to the top surface of the tube sheet to center the collar above the hole. The wire mesh cage is provided with a reinforcing sleeve that is attached to the wire mesh above the open end of the filter bag. The reinforcing sleeve has a close sliding fit within the collar so that when the filter bag is mounted and sealed within the hole, the collar will prevent lateral movement of the reinforcing sleeve.

The wire mesh cage also includes a venturi that is positioned concentrically within the reinforcing sleeve. During the periodic bag cleaning operation, the jet of high pressure air passing through the venturi induces additional air from the clean air chamber to flow into the bags thereby enhancing the cleaning operation.

BRIEF DESCRIPTION OF THE DRAWING

Further objects of the present invention together with additional features contributing thereto and advantages accruing therefrom will be apparent from the following description of a preferred embodiment of the present invention which is shown in the accompanying drawing, wherein.

DETAILED DESCRIPTION OF A PREFERRED EMBODIMENT

Figure 1:
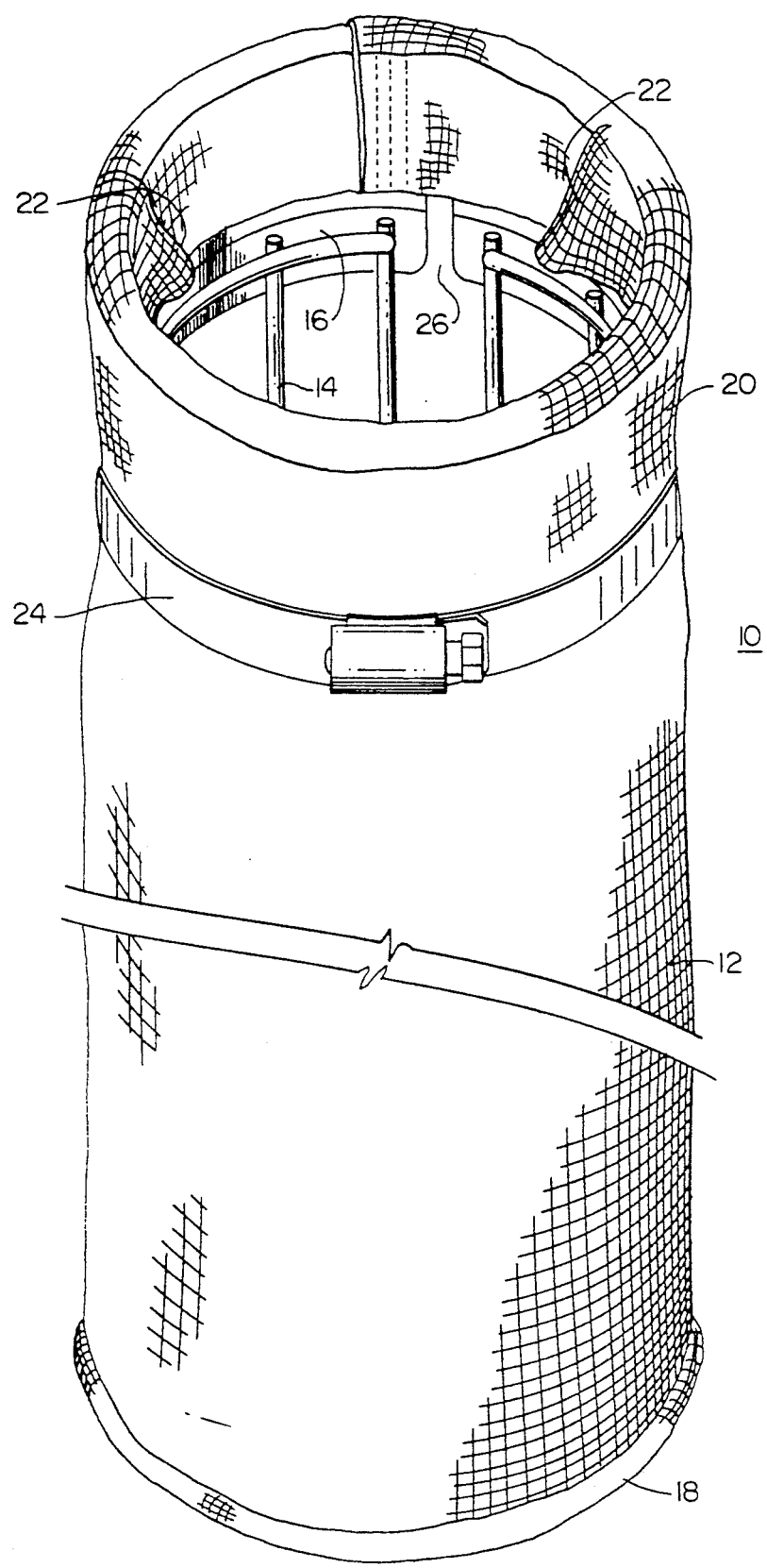
FIG. 1 is a perspective view of a prior art bottom loading filter bag.

Referring now to FIG. 1 there is shown a prior art filter bag assembly generally referenced 10. The filter bag assembly 10 is composed of a filter bag 12 which is given support and structure by an internal wire mesh cage 14. The prior art filter bag assembly 10 includes a bottom end 18 and an open end 20. A collar 16 is provided at the open end of the filter bag 12 as shown in FIG. 1 and is fastened to the internal wire mesh cage 14. The material forming the filter bag 12 extends beyond the collar 16 and is folded over the collar 16 to complete the filter bag assembly 10. This arrangement leads to unavoidable folds 22 as shown in FIG. 1.

The prior filter bag assembly 10 shown in FIG. 1 is mounted to a downwardly directed collar provided on the tube sheet (not shown) and is secured thereto by a hose clamp 24. The collar 16 of the prior art cage 14 is further provided with a slit 26 so that the collar 16 may be fastened to the above-mentioned downwardly projected collar of the tube sheet. When the prior art filter bag assembly 10 is mounted to the tube sheet, the folds 22 create pathways between the collar 16 and the downwardly directed collar of the tube sheet. These pathways allow dust laden air to enter directly into the interior of the prior art filter bag assembly even when the hose clamp 24 is fully tightened.

Figure 2:
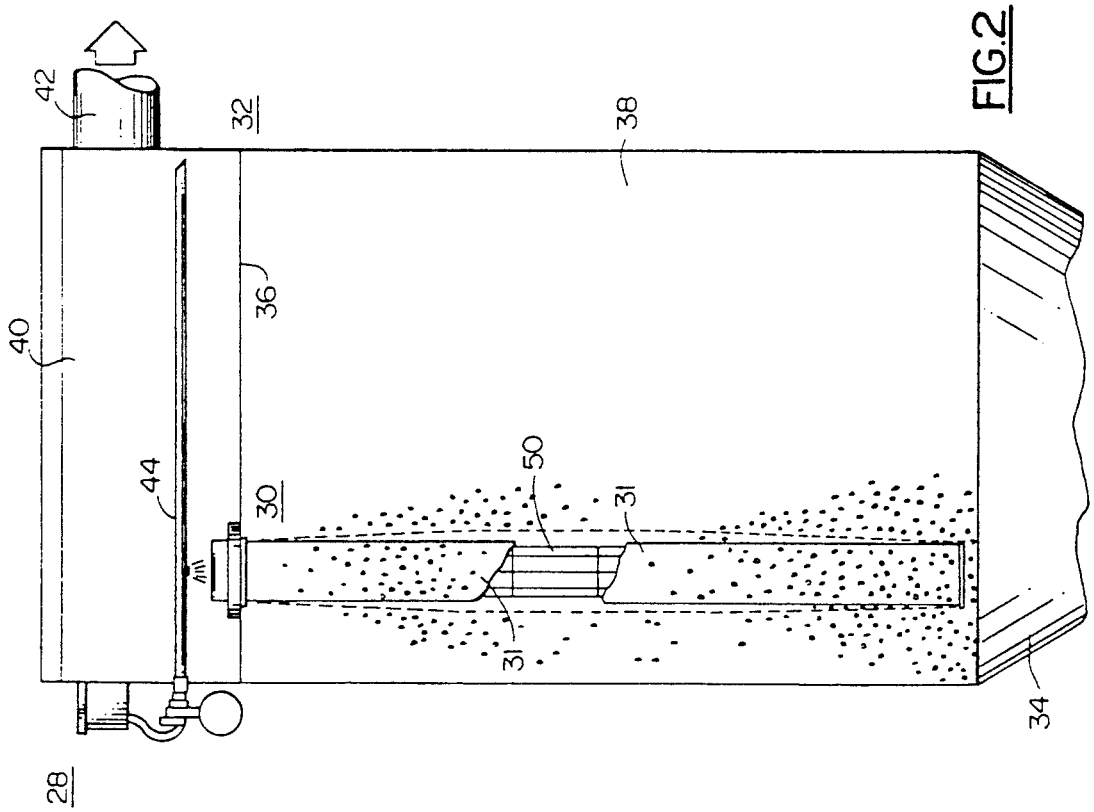
FIG. 2 is an elevational schematic view showing a dust collector and the filter bag of the present invention supported within the dust collector baghouse from a tube sheet.

FIG. 2 shows a dust collector 28 containing in accordance with the present invention a filter bag assembly 30 having a filter bag 31 and an internal wire mesh cage 50. The dust collector 28 is composed of an upper housing 32 and a hopper section 34. The upper housing 32 contains a tube sheet 36 that divides the upper housing 32 into a baghouse portion 38 and a clean air chamber 40. The clean air chamber 40 includes an exhaust outlet 42 and also includes a blow tube 44. As depicted in FIG. 2, the blow tube 44 provides periodic blasts of high pressure air that are directed into the filter bag assembly 30. This blowdown feature shakes loose small dust particles from the outside surface of the filter bag 31 collected thereon during the filtration process. The hopper 34 includes an inlet (not shown) for receiving dust laden air and an airlock assembly (not shown) to remove the particulate matter and dust. The hopper inlet and airlock assembly are not shown because these elements are not considered to be germane to the present invention.

Figure 3:
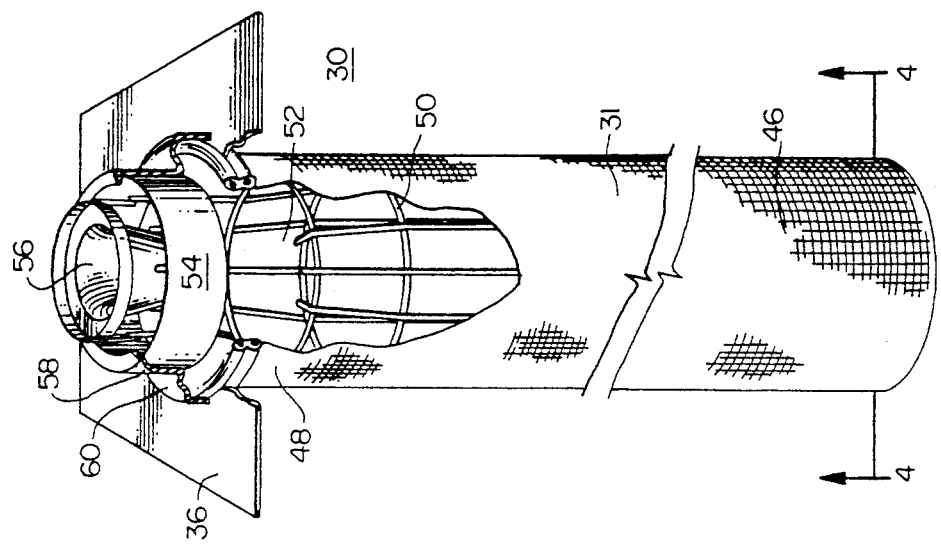
FIG. 3 is a partially broken away perspective view of the filter bag and tube sheet shown in FIG. 2.

As shown in greater detail in FIG. 3, filter bag 31 includes a closed bottom end 46 and an open end 48. The filter bag 31 is given structural support by the internal wire mesh cage 50. The wire mesh cage 50 includes an access opening 52 and is further provided with a reinforcing sleeve 54 secured to the wire mesh above the open end of the filter bag 31. A venturi 56 is fastened to the wire mesh cage 50 and situated concentrically within the reinforcing sleeve 54. The tube sheet 36 is provided with a collar 58 that includes a flange portion 60 fastened or welded to the top surface of the tube sheet 36 as shown in FIGS. 3 and 4.

Figures 4, 5:
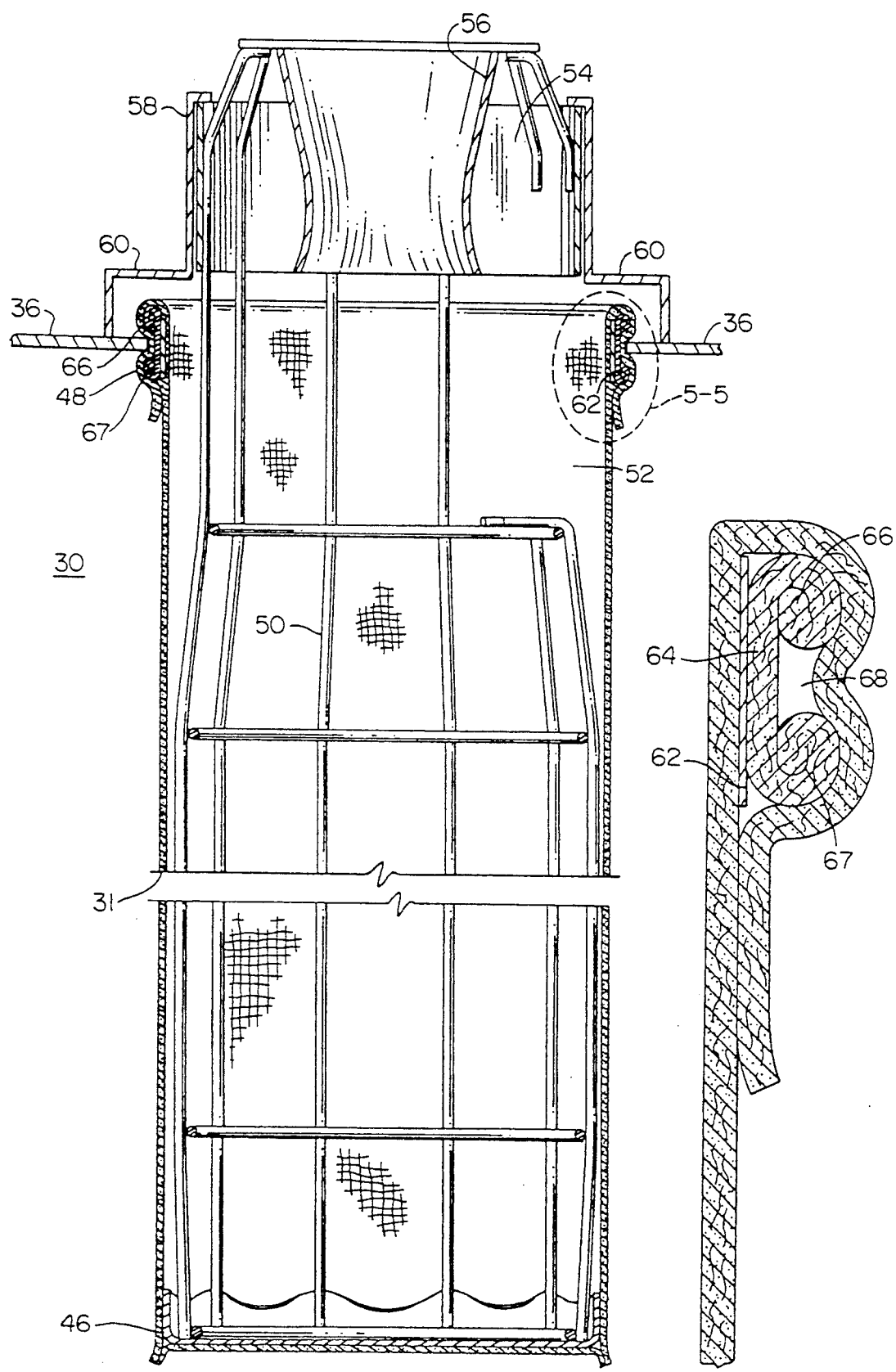
FIG. 4 is a cross sectional view taken along line 4—4 of FIG. 3.
FIG. 5 is a partial sectional view of the detail 5—5 indicated in FIG. 4.

Referring now to FIGS. 4 and 5, it can be seen that the open end 48 of the filter bag 31 includes a circular snap band 62. The outer circumference of the snap band 62 is provided with a length of felt 64. The edges of the length of felt 64 are rolled upon themselves to form a pair of rings 66 and 67 around the snap band, as shown in greater detail in FIG. 5. An annular groove 68 is thus formed between the pair of rings 66 and 67. The fabric material of the filter bag 31 is extended past the snap band 62 and folded outwardly over both the snap band 62 and the length of felt 64. This extended section of filter material is secured to the outer surface of the filter bag below the snap band 62 so that the snap band is restrained against vertical movement along the length of the filter bag. The snap band 62 is preferably made from stainless steel, while the length of felt is preferably composed of the filter fabric used to form the filter bag 31. The filter material comprising the filter bag 31 may include fabrics made preferably from woven fiberglass, polyester, acrylic or a variety of other materials depending upon the type of particulate matter to be filtered and relevant physical variables associated with the processing environment. After its effective service life, the filter bag 31, including the snap band 62 and length of felt 64 secured therein as described above, may be easily removed from the wire mesh cage 50 and replaced with a new filter bag.

To install the filter bag assembly 30 into the tube sheet 36, the open end 48 of the filter bag 31 is easily depressed into the access opening 52 of the wire mesh cage 50 by virtue of the resiliency of the circular snap band 62. In this elastically deformed condition, the open end 48 of the filter bag 31 can be quickly pre-positioned within the hole provided in the tube sheet 36. In this pre-positioned condition, an arc length segment of the ring 66 is positioned above the tube sheet and a corresponding arc length segment of the ring 67 is positioned below the tube sheet 36. The snap band 62 is then allowed to retain its circular shape. As this happens, the edges of the tube sheet 36 will effectively press the filter material of bag 31 into the annular groove 68 provided between the felt rings 66 and 67. The pressure exerted by the snap band against the edge of the tube sheet is sufficient to securely hold and suspend the filter bag assembly 30 from the tube sheet 36. In addition, this arrangement provides an airtight seal between the filter bag 31 and the tube sheet 36, thus preventing any dust or dirt laden air from entering directly into the filter bag and the clean air chamber 40 shown in FIG. 2.

To provide additional lateral support between the filter bag assembly 30 and the tube sheet 36, the reinforcing sleeve 54 has a close sliding fit within the collar 58 as shown in FIGS. 3 and 4. Upon installation, the reinforcing sleeve 54 will mate with the collar 58 while the open end 48 of the filter bag 31 is being properly positioned within the tube sheet 36. After proper alignment and installation, the filter bag assembly 30 is securely suspended from the hole provided in the tube sheet and laterally supported by the close sliding fit between the sleeve 54 and the collar 58. The venturi 56 is supported by the wire mesh concentrically within the reinforcing sleeve 54 and above the snap band 62 so as not to interfere with the access opening 52 during the above-described installation procedure. During the periodic bag cleaning operation, the jet of high pressure air provided by blow tube 44 passing through the venturi 56 induces additional air from the clean air chamber to flow into the bags 31 thereby enhancing the effectiveness of the cleaning operation.

While this invention has been described in detail with reference to a certain preferred embodiment, it should be appreciated that the present invention is not limited to that precise embodiment. Rather, in view of the present disclosure, many modifications and variations would present themselves to those of skill in the art without departing from the scope and spirit of this invention, as defined in the appended claims.

What is claimed is:

1. In a dust collector of the type having a baghouse including an let for receiving air to be filtered, an outlet for exhausting filtered air, a plurality of cylindrical filter bags each having an open end and an internal support member, the filter bags being positioned between said inlet and outlet to filter airborne particulate matter from the inlet air, and a tube sheet with a top and a bottom side, the tube sheet for supporting said plurality of cylindrical filter bags within said baghouse, the improvement comprising:

an access opening formed in the internal support member being positioned proximate to the open end of the filter bag associated therewith;

means for elastically deforming the open end of the filter bag into said access opening so that upon reformation, the open end is capable of being snapped into a circular hole provided in the tube sheet and securely seated therein in an airtight manner; and a collar having a radially extended flange portion being attached on the top side of the tube sheet around the circular hole to center said collar above the hole, said collar having an inside diameter being less than the diameter of the circular hole whereby the filter bag and internal support member are only mountable in the baghouse from beneath the tube sheet.

2. The dust collector according to claim 1 wherein the filter bag has a closed bottom and the internal support member includes a wire mesh cage that extends from the bottom of the filter bag to slightly beyond the open end thereof to laterally support the filter bag during filtration.

3. The dust collector according to claim 2 wherein the filter bag is formed from a dust impervious cloth material and said means for elastically deforming the open end of the filter bag includes:

a resilient snap band positioned around the outer circumference of the cylindrical filter bag and proximate to the open end thereof to allow a portion of the cloth material to extend beyond the snap band; and a length of felt having top and bottom edges and being attached to the outer circumference of said resilient snap band, each of the edges being rolled upon itself to form a pair of rings around the snap band and an annular groove between the rings.

4. The dust collector according to claim 3 wherein the extended cloth material at the open end of the filter bag is folded over said resilient snap band and attached thereunder to the filter bag so that when the snap band is depressed into said access opening to readily position the filter bag within the circular hole of the tube sheet and subsequently allowed to retain its shape, the edges of the circular hole will push the cloth material into the annular groove between the rings thereby forming an airtight seal between the filter bag and the tube sheet.

5. The dust collector according to claim 2 wherein the wire mesh cage includes a reinforcing sleeve attached to the wire mesh above the open end of the filter bag, said reinforcing sleeve having a close sliding fit within said collar so that when the filter bag is mounted and sealed within the hole, said collar will prevent lateral movement of said reinforcing sleeve.

6. The dust collector according to claim 5 wherein said wire mesh cage includes a venturi attached to the wire mesh and positioned concentrically within said reinforcing sleeve to induce additional air into the filter bag during cleaning thereof, said venturi thereby enhancing the cleaning of the bag.

7. In a dust collector of the type having a baghouse including an inlet for receiving air to be filtered, an outlet for exhausting filtered air, a plurality of cylindrical filter bags each having an open end, a closed bottom end, and an internal support member that extends from the bottom of the filter bag to slightly beyond the open end thereof, the filter bags being positioned between said inlet and outlet to filter airborne particulate matter from the inlet air, and a tube sheet for supporting said plurality of cylindrical filter bags within said baghouse, the improvement comprising:

an access opening formed in the internal support member being positioned proximate to the open end of the filter bag associated therewith;

means for elastically deforming the open end of the filter bag into said access opening so that upon reformation, the open end is snapped into a circular hole provided in the tube sheet and securely seated therein in an airtight manner;

a collar having a radially extended flange portion being attached around the circular hole of said tube sheet to center said collar above the hole; and said internal support member having a reinforcing sleeve attached to the wire mesh above the open end of the filter bag, said reinforcing sleeve having a close sliding fit within said collar so that when the filter bag is mounted and sealed within the hole, said collar will prevent lateral movement of said reinforcing sleeve whereby the filter bag is mounted in the baghouse from beneath the tube sheet.

8. The dust collector according to claim 7 wherein the filter bag is formed from a dust impervious cloth material and said means for elastically deforming the open end of the filter bag includes:

a resilient snap band positioned around the outer circumference of the cylindrical filter bag and proximate to the open end thereof to allow a portion of the cloth material to extend beyond the snap band; and a length of felt having top and bottom edges and being attached to the outer circumference of said resilient snap band, each of the edges being rolled upon itself to form a pair of rings around the snap band and an annular groove between the rings.

9. The dust collector according to claim 8 wherein the extended cloth material at the open end of the filter bag is folded over said resilient snap band and attached thereunder to the filter bag so that when the snap band is depressed into said access opening to readily position the filter bag within the circular hole of the tube sheet and subsequently allowed to retain its shape, the edges of the circular hole will push the cloth material into the annular groove between the rings thereby forming an airtight seal between the filter bag and the tube sheet.

10. The dust collector according to claim 8 wherein said wire mesh cage includes a venturi attached to the wire mesh and positioned concentrically within said reinforcing sleeve to induce additional air into the filter bag during cleaning thereof, said venturi thereby enhancing the cleaning of the bag.

* * * * *